United States Patent
Kiukkonen et al.

(10) Patent No.: US 9,338,171 B2
(45) Date of Patent: May 10, 2016

(54) METHOD AND APPARATUS FOR CONTROLLING ACCESS TO RESOURCES

(71) Applicants: Niko Tapani Kiukkonen, Veikkola (FI); Janne Marin, Espoo (FI); Sverre Slotte, Esbo (FI)

(72) Inventors: Niko Tapani Kiukkonen, Veikkola (FI); Janne Marin, Espoo (FI); Sverre Slotte, Esbo (FI)

(73) Assignee: NOKIA CORPORATION, Espoo (FI)

( * ) Notice: Subject to any disclaimer, the term of this patent is extended or adjusted under 35 U.S.C. 154(b) by 351 days.

(21) Appl. No.: 13/720,439

(22) Filed: Dec. 19, 2012

(65) Prior Publication Data

US 2013/0174277 A1    Jul. 4, 2013

Related U.S. Application Data

(60) Provisional application No. 61/581,910, filed on Dec. 30, 2011.

(51) Int. Cl.
*H04L 29/06*    (2006.01)
*H04W 4/08*    (2009.01)

(52) U.S. Cl.
CPC ............... *H04L 63/104* (2013.01); *H04W 4/08* (2013.01)

(58) Field of Classification Search
CPC ..... H04L 63/104; H04L 63/102; H04W 4/08; G06F 21/10; G06F 21/31; G06F 21/6218
USPC .......................................................... 726/28
See application file for complete search history.

(56) References Cited

U.S. PATENT DOCUMENTS

| | | | |
|---|---|---|---|
| 6,377,548 B1 | 4/2002 | Chuah | |
| 7,263,076 B1 | 8/2007 | Leibovitz et al. | |
| 2002/0124053 A1 | 9/2002 | Adams et al. | |
| 2005/0048983 A1 | 3/2005 | Abraham et al. | |

(Continued)

FOREIGN PATENT DOCUMENTS

| | | |
|---|---|---|
| WO | 03/028313 A2 | 4/2003 |
| WO | 03/029916 A2 | 4/2003 |

(Continued)

OTHER PUBLICATIONS

Adnan Ahmad et al., "Distributed Access Control for Social Networks", Conference Publication, 2011 7th International Conferences on Information Assurance and Security (IAS), pp. 68-73.

(Continued)

*Primary Examiner* — Kambiz Zand
*Assistant Examiner* — Benjamin Kaplan
(74) *Attorney, Agent, or Firm* — Ditthavong & Steiner, P.C.

(57) ABSTRACT

An approach is provided for controlling access to resources according to social connections and/or characteristics of the resources. An access control platform determines one or more resources associated with at least one user, at least one device associated with the at least one user, or a combination thereof. The access control platform further processes and/or facilitates a processing of social networking information associated with the at least one user, the at least one device, or a combination thereof to determine one or more social networking groups. The access control platform also causes, at least in part, a controlling of access to the one or more resources for one or more other users, one or more other devices associated with the one or more other users, or a combination thereof based, at least in part, on membership in the one or more social networking groups.

17 Claims, 10 Drawing Sheets

(56) References Cited

U.S. PATENT DOCUMENTS

| | | |
|---|---|---|
| 2007/0033197 A1 | 2/2007 | Scherzer et al. |
| 2007/0067853 A1 | 3/2007 | Ramsey |
| 2008/0008140 A1 | 1/2008 | Rorssell |
| 2008/0141348 A1 | 6/2008 | Hovnanian et al. |
| 2008/0195741 A1 | 8/2008 | Wynn et al. |
| 2008/0320576 A1 | 12/2008 | Curling |
| 2009/0292814 A1 | 11/2009 | Ting et al. |
| 2010/0157850 A1 | 6/2010 | Horn et al. |
| 2011/0258303 A1 | 10/2011 | Nath et al. |
| 2012/0030734 A1 | 2/2012 | Wohlert |
| 2012/0066259 A1 | 3/2012 | Huber et al. |
| 2012/0204221 A1 | 8/2012 | Monjas Llorente et al. |

FOREIGN PATENT DOCUMENTS

| | | |
|---|---|---|
| WO | 2006/047879 A1 | 5/2006 |
| WO | 2011/006231 A1 | 1/2011 |

OTHER PUBLICATIONS

International Search Report corresponding to Application No. PCT/FI2012/051297, mailed on Jun. 3, 2013.

Written Opinion of the International Searching Authority corresponding to Application No. PCT/FI2012/051297, mailed on Jun. 3, 2013.

Notification of Transmittal of the International Search Report and the Written Opinion of the International Searching Authority, or the Declaration corresponding to Application No. PCT/FI2012/051297, mailed on Jun. 3, 2013.

METHOD AND APPARATUS FOR CONTROLLING ACCESS TO RESOURCES

RELATED APPLICATIONS

This application claims the benefit of the earlier filing date under 35 U.S.C. §119(e) of U.S. Provisional Application Ser. No. 61/581,910 filed Dec. 30, 2011, entitled "Method and Apparatus for Controlling Access to Resources," the entirety of which is incorporated herein by reference.

BACKGROUND

Service providers and device manufacturers (e.g., wireless, cellular, etc.) are continually challenged to deliver value and convenience to consumers by, for example, providing compelling network services. One such service includes sharing resources among users. By way of example, a user may wish to allow other users to access a resource, such as a wireless access point when the designated users are within range of the access point. Juxtaposed with the ability to enable users to share resources is the need to maintain security with respect to the resources, and to enable sharing of the resources without degradation of performance of the resources. By way of example, a user that shares a wireless access point among designated users may wish to maintain a certain level of security and performance of the wireless access point. Although certain resources, such as wireless access points, have built-in security features, the security features may make sharing the resources complex. For example, to revoke the permission of one user to access an access point, the security settings with respect to the access point must be accessed to change the security settings (e.g., password, revocation of a MAC address, etc.). Unfortunately, there is currently no method that controls the access users have to resources that is independent of controlling the resource settings directly to maintain the security and performance of the resources.

SOME EXAMPLE EMBODIMENTS

Therefore, there is a need for an approach for controlling access to resources according to social connections and/or characteristics of the resources.

According to one embodiment, a method comprises determining one or more resources associated with at least one user, at least one device associated with the at least one user, or a combination thereof. The method also comprises processing and/or facilitating a processing of social networking information associated with the at least one user, the at least one device, or a combination thereof to determine one or more social networking groups. The method further comprises causing, at least in part, a controlling of access to the one or more resources for one or more other users, one or more other devices associated with the one or more other users, or a combination thereof based, at least in part, on membership in the one or more social networking groups.

According to another embodiment, an apparatus comprises at least one processor, and at least one memory including computer program code for one or more computer programs, the at least one memory and the computer program code configured to, with the at least one processor, cause, at least in part, the apparatus to determine one or more resources associated with at least one user, at least one device associated with the at least one user, or a combination thereof. The apparatus is also caused to process and/or facilitate a processing of social networking information associated with the at least one user, the at least one device, or a combination thereof to determine one or more social networking groups. The apparatus is further caused to control access to the one or more resources for one or more other users, one or more other devices associated with the one or more other users, or a combination thereof based, at least in part, on membership in the one or more social networking groups.

According to another embodiment, a computer-readable storage medium carries one or more sequences of one or more instructions which, when executed by one or more processors, cause, at least in part, an apparatus to determine one or more resources associated with at least one user, at least one device associated with the at least one user, or a combination thereof. The apparatus is also caused to process and/or facilitate a processing of social networking information associated with the at least one user, the at least one device, or a combination thereof to determine one or more social networking groups. The apparatus is further caused to control access to the one or more resources for one or more other users, one or more other devices associated with the one or more other users, or a combination thereof based, at least in part, on membership in the one or more social networking groups.

According to another embodiment, an apparatus comprises means for determining one or more resources associated with at least one user, at least one device associated with the at least one user, or a combination thereof. The apparatus also comprises means for processing and/or facilitating a processing of social networking information associated with the at least one user, the at least one device, or a combination thereof to determine one or more social networking groups. The apparatus further comprises means for causing, at least in part, a controlling of access to the one or more resources for one or more other users, one or more other devices associated with the one or more other users, or a combination thereof based, at least in part, on membership in the one or more social networking groups.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2)

at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for controlling access to resources according to social connections and/or characteristics of the resources are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to wireless access points as exemplary resources, it is contemplated that the approach described herein may be used with any other type of resource accessible over a network.

Figure 1:
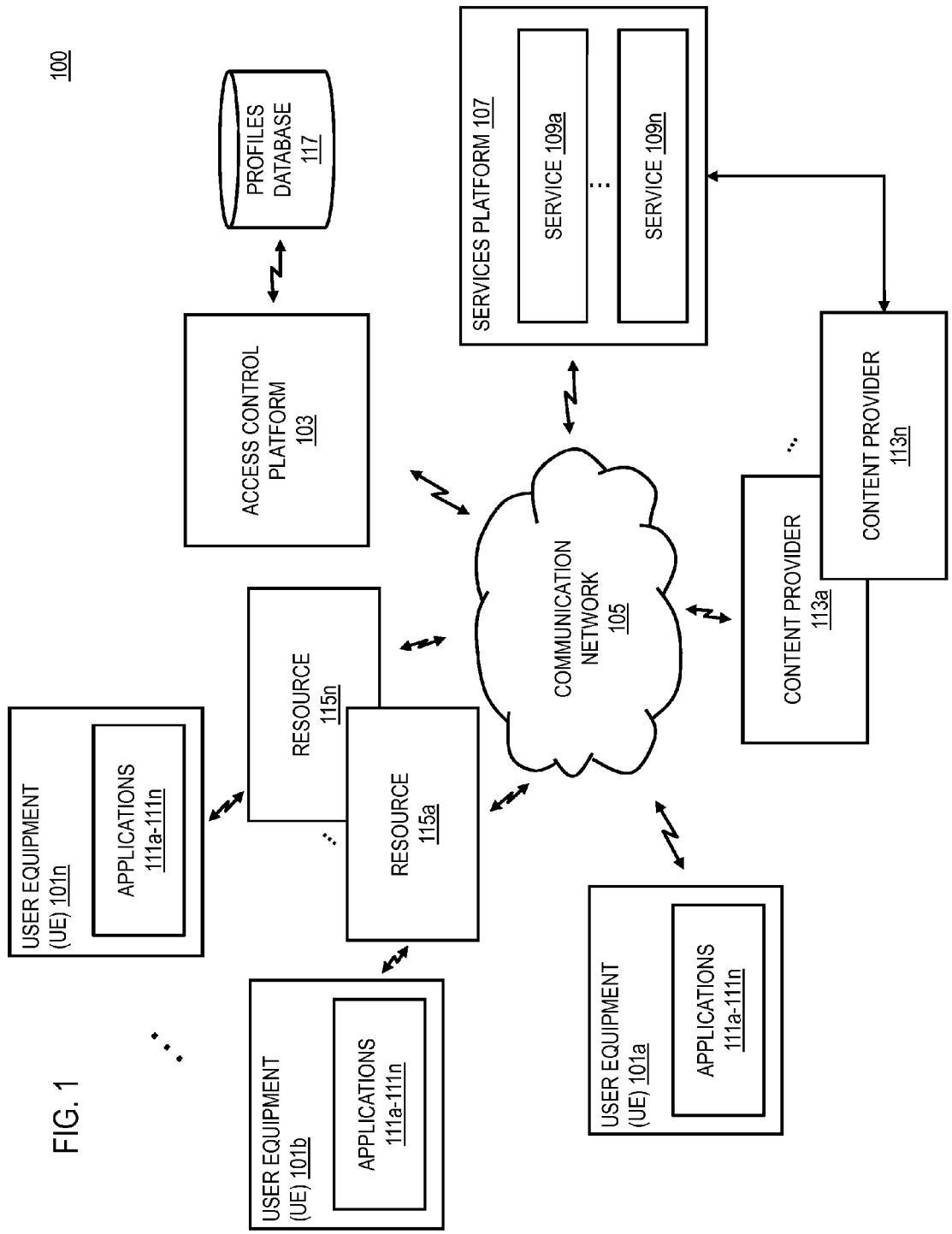
FIG. 1 is a diagram of a system capable of controlling access to resources, according to one embodiment.

FIG. 1 is a diagram of a system capable of controlling access to resources according to social connections and/or characteristics of the resources, according to one embodiment. As discussed above, service providers and device manufacturers are providing users with the ability to share resources among various users and devices. One such resource may be a wireless access point. Wireless access points allow an owner (e.g., host user) of the wireless access point to share a wireless connection to, for example, the Internet with other users. As the popularity of wireless access points and devices compatible with accessing the access points has increased, most of the access points are password protected. The password protection is used to prevent unauthorized people from connecting through the access point to, for example, the Internet or to other resources on a network without permission. The password protection is also used to prevent unauthorized users from accessing the access point and eavesdropping on communications associated with another user connected to the access point. Indeed, in some countries, such as Germany, there are legal obligations for owners of access points to protect and monitor the Internet access provided through access points they own. Thus, although security associated with access points is needed, it makes sharing the access point between family members, friends, and other users complex.

For example, a password for accessing the access point must be distributed among all of the users that are authorized to access the access point. In which case, to prevent a previously authorized user from accessing the access point, a new password must be created and distributed to the other authorized users. Alternatively, other even more complex processes may be used to prevent a previously authorized user from accessing the access point beyond merely changing the password. Further, beyond preventing unauthorized users from accessing an access point, issues concerning eavesdropping among authorized users may exist, or issues concerning degradation of services based on, for example, the number of users associated with an access point may exist. Exacerbating these issues are issues relating to the difficulties in controlling the access points directly through, for example, the configuration settings associated with the access point. For example, the configuration settings of the access point must be accessible otherwise the settings cannot be changed. Further, changing the settings is only a static way of controlling access to an access point is not as dynamic as the dynamic changing of users accessing the access point. Similar issues concern other types of resources, such as database accessible over a network.

To address these problems, a system 100 of FIG. 1 introduces the capability to control access to resources according to social connections associated with the host of the resources and/or characteristics of the resources. Depending on the social connections associated with other users and/or other devices associated with the other users as compared to the host user of the resources, the system 100 revokes or prevents access to the resources by the other users and/or the other devices. Further, depending on one or more characteristics associated with the one or more resources, such as, for example, a number of users accessing the one or more resources, a traffic load associated with the one or more resources, or a combination thereof, the system 100 revokes or prevents access to the resources by the other users and/or the other devices to maintain a quality of service provided by the one or more resources. The system 100 also introduces the capability to control the security and performance of resources independently from directly controlling the configuration of the resources by remotely controlling access to the resources at the device level.

The system 100 introduces the capability to determine one or more resources associated with a user, a device associated with the user, or a combination thereof. In one embodiment, the user or the device associated with the user may be considered a host and a host device. In one embodiment, the user may be considered the owner of the resource, and the device may be considered the resource (e.g., a wireless router). Further, the system 100 introduces the capability to process social networking information associated with the user, the device associated with the user, or the combination thereof to determine one or more social networking groups. The social networking groups define other users and their associations with the host user that owns and/or controls the one or more resources. By way of example, the social networking groups may include family members, friends, friends of friends, acquaintances, etc. Each of these groups may be further segmented into smaller groups, such as immediate family members, distant family members, close friends, long-lost friends, etc. The system 100 further introduces the capability to control access to the one or more resources for the other users, other devices associated with the other users, or a combination there based on a membership in the one or more social networking groups. For example, the control may be based on the social connections between the users that are accessing the resources and the host user of the resources based on, for example, the users' memberships in the one or more social networking groups. The control may also be based on one or more characteristics associated with a resource. By way of example, for a wireless access point, the characteristics may be the current load on the wireless access point such that the access of one or more users at the wireless access point is revoked to lessen the load.

As shown in FIG. 1, the system 100 comprises one or more user equipment (UE) 101a-101n (collectively referred to as UE 101) having connectivity to an access control platform 103 via a communication network 105. The access control platform 103 controls access to one or more resources 115 within the system 100 according to social connections and/or characteristics of the resources 115. The UE 101 may execute one or more applications 111a-111n (collectively referred to as applications 111). The applications may include, for example, one or more Internet browsing applications, navigational applications, calendar applications, etc. In one embodiment, the UE 101 may include an access control client application 111a that communicates with the access control platform 103. The access control platform 103 may then remotely configure and manage the connectivity options of the UE 101 through the access control client application 111a for accessing one or more resources. The access control client application 111a may also report status and/or measurement data to the access control platform 103 for the access control platform 103 to control the access by the UE 101 to the resources 115. As illustrated, the UE 101 may connect directly to the communication network 105, or may connect to the communication network 105 through, for example, one or more resources 115a-115n (collectively referred to as resources 115). Resources 115 that allow for one or more UE 101 to connect to the communication network 105 may include, for example, a wireless access point. In one embodiment, one or more resources 115 may be a part of the system 100 independent from providing access to the communication network 105. Rather, the UE 101 may connect to the resources 115 through the communication network 105.

In one embodiment, the access control platform 103 may be associated with, or connected to, a profiles database 117. The profiles database 117 may include access information associated with the resources 115, as well as access information associated with the UE 101. By way of example, the profiles database 117 may include security credentials for accessing one or more of the resources 115. The profiles database 117 may also include information regarding the social networking groups, and the association of one or more other users with respect to the social networking groups, associated with a host user of one or more resources 115 that are used to determine accessibility to the one or more resources 115.

The system 100 further includes a services platform 107 that includes one or more services 109a-109n (collectively referred to as services 109). The one or more services 109 may include, for example, one or more social networking services (SNS) 109a (e.g., Facebook, MySpace, Linkedin, etc.). The system 100 further includes one or more content providers 113a-113n (collectively referred to as content providers 113). The content providers 113 may provide content to any component of the system 100.

In one embodiment, the host user associated with one or more resources 115 adds the one or more resources to the access control platform 103 by uploading the security credentials associated with the one or more resources 115, along with identification information associated with the resources 115. The host user may also associate a hierarchy of groups of users that may access the one or more resources 115. The hierarchy may be based on, for example, the social distances one or more other users have with the host user. Such social distances may be defined by, for example, the relationship the other users have with the host user. By way of example, the host user may specify that users associated with the social networking groups of family, friends, friends of friends, and others may access one or more resources 115. The host user may further specify that family has priority over friends, friends have priority over friends of friends, and friends of friends have priority over other users. Accordingly, the access control platform 103 will provide users that are associated with the host user according to the social networking groups with the security credentials to access to the one or more resources 115. The host user may also add information associated with one or more devices associated with the host user to create another class of devices that may access the one or more resources 115, such as the group host user devices.

Accordingly, the access control platform 103 may control access to one or more resources 115 by one or more other users and/or one or more other devices associated with the other users, based on the social networking groups. The access may be controlled by revoking and/or preventing access to the one or more resources for one or more other users, one or more other devices, or a combination thereof based on the priority hierarchy. By way of example, if a user that is classified within the social networking group of family is currently accessing a resource 115a, if another user that is classified within the social networking group of friends attempt to access the same resource 115a, the user may be prevented from accessing the resource 115a based on a user of a higher priority currently user the resource 115a. Further, if the friend user has access to the resource and a family user accesses the resource 115a, the friend user may have their access revoked. The access of the friend is revoked to ensure security of the family user using the resource 115a. As such, lower-priority users, and devices associated with lower-priority users have their access to the resources 115 revoked or barred based on access to the resources 115 by higher-priority users based on the social networking groups.

In one embodiment, the host user may also specify characteristics associated with the one or more resources for the access control platform 103 to monitor and control access by one or more other users and/or one or more other devices based on the characteristics. The characteristics may consist of, for example, performance characteristics. By way of example where the one or more resources 115 include access points, the performance characteristics may include a number of users accessing the one or more wireless access points, a traffic load associated with the one or more access points, or a combination thereof. Accordingly, the access control platform 103 may control access to one or more access points by one or more other users and/or one or more other devices associated with the other users based on the social networking groups and the resource characteristics to maintain a certain level of the characteristics. As the characteristics of the resources change such that the characteristics satisfy or no longer satisfy one or more thresholds established by the host user of the resources 115, access to the resources 115 by one or more lower-priority users is revoked prior to one or more higher-priority users to have the characteristics again satisfy the thresholds.

In one embodiment, the access control platform 103 interacts with a service such as a SNS, a customer resource management service, a directory service, or any other service for determining and maintaining data regarding one or more users (e.g., contacts) associated with a host user. By way of example, a SNS 113a maintains a listing of various members, social networking group affiliations of said members, or a combination thereof as related to the host user. Each member of the SNS 109a registers with the SNS 109a by creating a profile for specifying personal details, interests, information sharing restrictions, marketing preferences, etc. In addition, the members are assigned or create a user name, a login password, a security question and the like as access credentials for the SNS 109a.

Still further, the host user may be associated with other members via group affiliation, i.e., a group comprising one or more other members of the SNS 109a. For example, a group entitled the "Wisconsin Badgers" may be formed at the SNS 109a for supporting the sharing of information between members based on their common interests. In this example, the host user may interact exclusively with members of this group to engage in discussions regarding activities associated with the Wisconsin Badgers. Similarly, other interest groups may also be associated with the host user, where the participating other members represent a portion of the entire list of members associated with the host. Alternatively, a group may also include the overall list of members (contacts) associated with the specific profile of the host user. It is noted, therefore, that a group may include an overall/global listing of all members associated with the host or a sub-grouping of members representing only a portion of the overall/global listing.

The host user communicates with and recognizes various other members of the SNS 109a by way of social networking information, including a username, alias, group reference, user reference, icon or other identifier. It is noted that the social networking information includes that which is specified by the host regarding the one or more other members, that which is specified by the one or more other members relative to the host, or a combination thereof.

In certain embodiments, the access control platform 103 relies upon the SNS 109a to verify and/or authenticate a user and/or UE 101 as belonging to a social networking group. Under this approach, the access control platform 103 is able to readily cross reference requesting users of UE 101 against one or more groups specified by the host user to access the resources 115.

The host user enters information regarding the social networking information related to the host user, such as a login name or other identifier. The access control platform 103 utilizes the social networking information as entered to authenticate the user against the SNS 109a. The authentication process may include determining an ability of the user device to actually login and access the host's SNS profile page based on the provided social networking information. In addition, the authentication process may include monitoring of the status of the current contacts lists (e.g., in the case of a private wireless access point), members of a group, fans of a page, or users who associated with the host. By monitoring the list of members indicated as friends as well as group affiliation with the host, the access control platform 103 is able to associate users and user devices with resources 115 accordingly.

Furthermore, the access control platform 103 determines what access rights are made available to the one or more members of an associated group. Access rights may be based on, for example, whether a relationship identifier is family, friend, friend of a friend, acquaintance, other, etc. In other instances, the indicator may relate to some other level of closeness, familiarity or priority of the host relative to the member. It is noted that the host user of the resource may be an individual person, a group, a company or organization, a website, etc.

When the access rights are confirmed, the access control platform 103 then provisions the one or more users of UE 101 with access credentials associated with the one or more resources 115. The provisioning is done utilizing existing mechanisms implemented in the mobile devices for remotely managing and configuring the resources 115. For example, the access credentials may be pushed to UE 101 by way of a push service, synchronized at the UE 101 via a synchronization service with the access control platform 103, etc. It is noted that provisioning of the credentials enables the UE 101 to access the one or more resources 115 when a request for access to the resources 115 is made.

In one embodiment, the access control platform 103 includes an additional security feature for preventing a malicious or unauthorized user from tampering with the access control client application 111a that interfaces with the access control platform 103 for accessing one or more resources 115. Such a malicious user may obtain the security credentials for accessing a resource 115a and disable the access control client application 111a effectively enabling the user to use the resources 115 even if not intended by the host of the resources 115. To implement this additional security, the access control platform 103 monitors UE 101 accessing the one or more resources 115 to ensure that the UE 101 are accessing the resources 115 according to the established hierarchies and/or the characteristics of the resources 115. By way of example, the access control platform 103 will monitor for UE 101 accessing an access point and determine whether the UE 101 has actual authority to access the access point according to the hierarchy of the UE 101 as compared to other UE 101 currently accessing the access point. If the access control platform 103 determines that unauthorized UE 101 are accessing the resources 115, the access control platform 103 may cause the UE 101 to eliminate access rights to the one or more resources.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the access control platform 103, the services platform 107, the content providers 113, and the resources 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
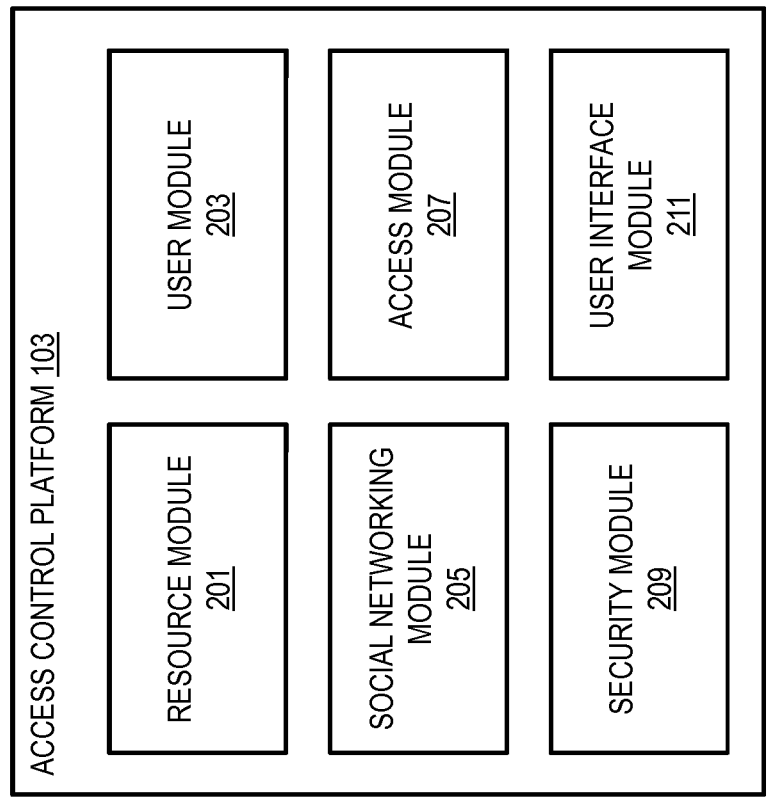
FIG. 2 is a diagram of the components of an access control platform, according to one embodiment.

FIG. 2 is a diagram of the components of an access control platform 103, according to one embodiment. By way of example, the access control platform 103 includes one or more components for controlling access to resources. It is contemplated that the functions of these components may be combined in one or more components or performed by other components of equivalent functionality. In this embodiment, the access control platform 103 includes a resource module 201, a user module 203, a social networking module 205, an access module 207, a security module 209 and a user interface (UI) module 211.

The resource module 201 registers and identifies the resources 115 that are recognized by the access control platform 103 and that the access control platform 103 provides access control over. The UI module 211 creates one or more user interfaces for users that own or control resources (e.g., host users) to interface with the resource module 201 to input information associated with the resources 115. The information may include, for example, some type of identification of the resources 115, such as a uniform resource indicator (URI), a uniform resource locator (URL), an Internet protocol (IP) address, etc. The information may also include the security credentials associated with accessing the resources 115, such as passwords, secret keys, an encryption key, etc. In one embodiment, the resource module 201 may interface with the profiles database 117 for generating one or more profiles associated with the resources 115 based on the information inputted regarding the resources 115. In such an embodiment, the resource module 201 may access the profiles database 117 for the information for the resources 115.

The user module 203 registers and identifies the users and/or user devices that are recognized by the access control platform 103 and that are controlled in providing access to one or more resources 115. The user module 203 may also register and identify the users and/or the devices associated with the users that own and/or host the resources 115. The user module 203 may associate the host users and the host devices with the resources 115 that the host users and/or the host devices own and/or control. In one embodiment, the UI module 211 creates one or more user interfaces for the host users to interface with the user module 203 to input information associated with one or more users and/or devices that have authority to access one or more resources 115. The host users may also input information associated with the social networking groups the users are associated with, such as family, friends, friends of friends, and others. Thus, in one embodiment, the host user of a resource 115a may manually enter information into the user module 203 regarding the users and/or devices that may access a resource. In one embodiment, the user module 203 may interface with the profiles database 117 for generating one or more profiles with respect to users and/or devices that are registered with the access control platform 103 as both host users that own or control one or more resources and other users and/or other devices that may access one or more resources. In such an embodiment, the resource module 201 may access the profiles database 117 for the information for the resources 115.

In one embodiment, the social networking module 205 may access one or more services 109 and/or content providers 113 for automatically determining social networking information with respect to a host user and one or more other users and/or other devices. The social networking module 205 may interface with the user module 203 and or the resource module 201 to determine a host user and/or a device associated with a host user. Further, the social networking module 205 may then search various services 109, such as social networking services 109a, and content providers 113 for other users and/or other devices associated with the users and the social connections of the other users and/or other devices with respect to the host user. Included within the social connections is information pertaining to the type of connection, such as, for example, family, friend, friend of friend, and other, that may be used to classify the other user and/or other device into a hierarchy established by a host user for a resource 115a. The information that the social networking module 205 determines may be included in one or more resource profiles and/or one or more user profiles stored within the profiles database 117, as described above.

The access module 207 controls the access of one or more devices to the resources 115. The access module 207 monitors the users and/or user devices that are currently accessing the resources 115 and that are attempting to access the resources 115. Based on whether the control of the resources 115 is based on a hierarchy of users, the characteristics of the resources 115, or both, the access module 207 revokes or prevents users and/or user devices from accessing the resources 115. In one embodiment, the access module 207 interfaces with the access control client applications 111a running on the UE 101 to monitor whether the UE 101 are currently accessing one or more resources 115 or attempting to access one or more resources 115. When a UE 101 or a user associated with a UE 101 attempts to access a resource 115a, the access module 207 will determine the priority of the user and/or the UE 101 and will determine the priority of other users and/or UE 101 currently accessing the resource 115a to determine whether the user or UE 101 attempting to access the resource 115a has the priority to access the resource 115a. When the access module 207 is monitoring users and/or devices accessing the resource 115a, the user or the UE 101 will have the priority to access the resource 115a when the user or the UE 101 has a priority that is equal to or greater than the other users and/or UE 101 currently accessing the resource 115a. Upon the user or the UE 101 accessing the resource 115a, the access module 207 further determines whether other users or UE 101 currently accessing the resource have a priority that is lower than the new user or the new UE 101 to the resource 115a. If there is a user or a UE 101 that is accessing the resource 115a that has a lower priority, the access module 207 will interface with the access control client application 111a of the lower-priority users or the lower-priority UE 101 to revoke the access to the resource 115a. The access to the resource is revoked until the higher-priority users and/or higher-priority UE 101 no longer are accessing the resource 115a. In which case, the lower-priority user and/or lower-priority UE 101 may again access the resource 115a.

When the access control platform 103 controls access to resources 115 based on the characteristics of the resources 115, the access module 207 determines the characteristics of the resources 115 when one or more users and/or UE 101 attempt to access the resources 115. If the one or more characteristics of the resources 115 do not satisfy one or more thresholds associated with the characteristics, the access module 207 prevents the users and/or the UE 101 from accessing the resources 115. By way of example, a resource 115a may have a characteristic associated with the number of devices that may be connected to the resource 115a at the same time. A UE 101 attempting to connect to the resource 115a may cause the number of devices connected to the resource 115a to exceed the threshold number of devices. In which case, the access module 207 will prevent the UE 101 from accessing the resource 115a. The access module 207 will also monitor the characteristics associated with the resources 115 independently from merely monitoring users and/or UE 101 attempting to access the resources 115 and will control access to the resources based on the monitored characteristics. By way of example, the access module 207 may monitor the bandwidth associated with a resource 115a (e.g., wireless access point). When the bandwidth exceeds a threshold, such that the quality of service provided by the resource 115a drops below acceptable levels, the access module 207 may act to revoke access to the resource 115a to one or more UE 101 currently accessing the resource 115a. Access to the resource 115a is revoked, for example, to adjust the bandwidth of the resource 115a to acceptable levels. The access module 207 may revoke access to the resource 115a according to the hierarchy of users and/or UE 101 currently accessing the resource 115a, such that lower-priority user and/or lower-priority devices have their access revoked prior to higher-priority users and higher-priority devices.

In one embodiment, the security module 209 prevents malicious or unauthorized users from tampering with the access control client application 111a that interfaces with the access control platform 103 for accessing one or more resources 115. The security module 209 monitors UE 101 accessing the resources 115 to ensure that the UE 101 are accessing the resources 115 according to the established hierarchies and/or the characteristics of the resources 115. The security module 209 may interface with the access control client application 111a executed at the UE 101, or may interface with, for example, a secondary application 111b executed at the UE 101 that acts as a backup security application that monitors for the expected communications between the access control client application 111a and the access control platform 103 when a UE 101 attempts to access a resource 115a. If the expected communications do not occur, such as the access control client application 111a not communicating with the access control platform 103 to determine the priority of the UE 101 accessing the resource, or to determine the characteristics of the resource 115a, the security module 209 may eliminate the security credentials at the UE 101 to prevent the UE 101 from accessing the resource 115a. The elimination of the security credentials is different than the revocation of access because the revocation of access is temporary based on, for example, the priority of users accessing a resource 115a or the characteristics of the resources 115. The elimination of the security credentials is permanent such that the UE 101 no longer has the security credentials (e.g., password, security key, etc.) that are necessary to access the resource 115a. Thus, the security module prevents malicious users from bypassing the access control platform 103 and/or the access control client application 111a to access one or more resources 115 without permission.

Figure 3:
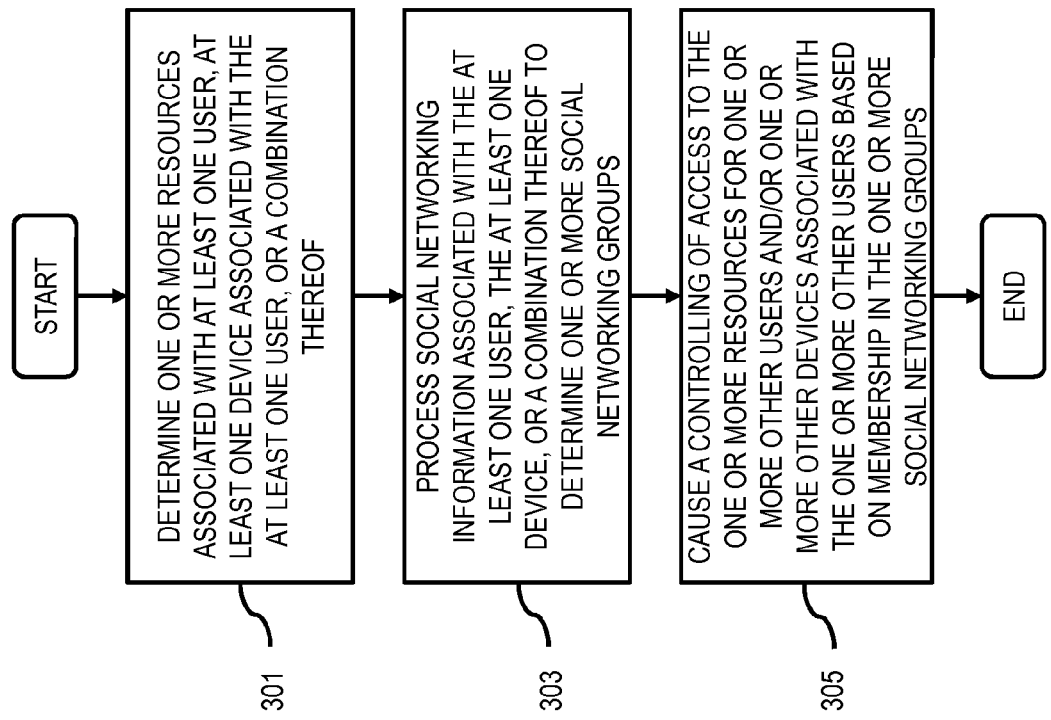
FIG. 3 is a flowchart of a process for controlling access to resources, according to one embodiment.
Figure 8:
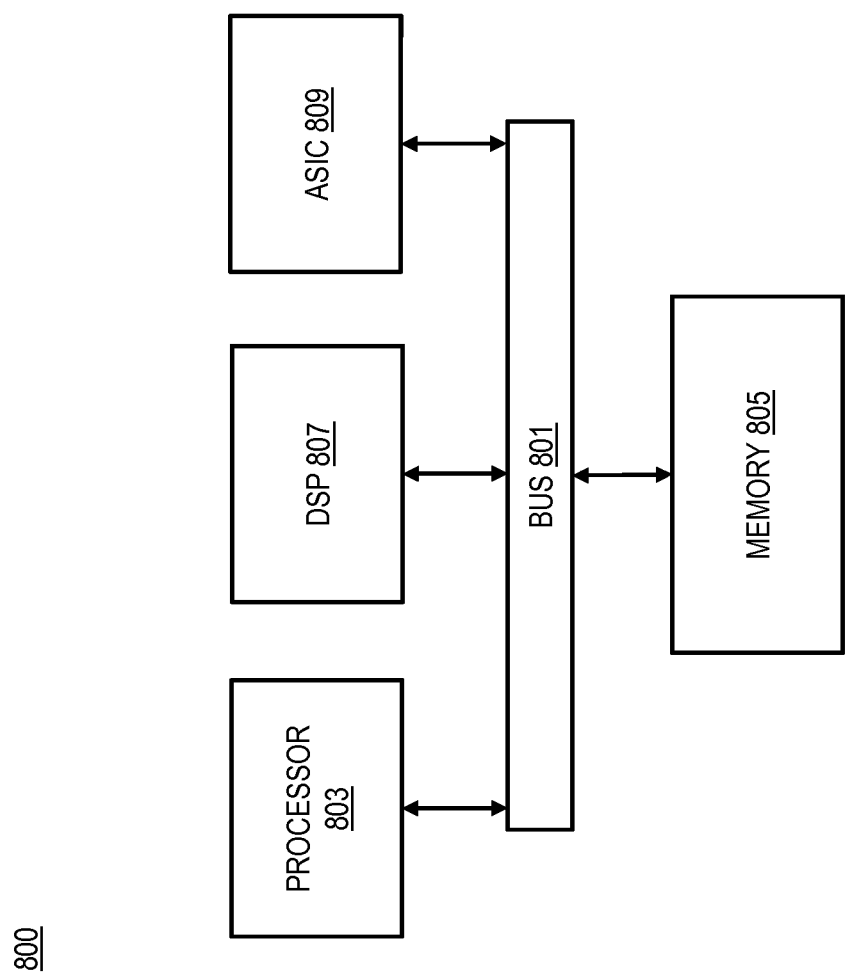
FIG. 8 is a diagram of a chip set that can be used to implement an embodiment of the invention.

FIG. 3 is a flowchart of a process for controlling access to resources, according to one embodiment. In one embodiment, the access control platform 103 performs the process 300 and is implemented in, for instance, a chip set including a processor and a memory as shown in FIG. 8. In step 301, the access control platform 103 determines one or more resources associated with at least one user, at least one device associated with the at least one user, or a combination thereof.

The at least one user may be a user that owns or controls the one or more resources 115 (e.g., a host user). The at least one device may be one or more devices that are associated with the host user. The one or more resources may be resources 115 that are accessible by the host user/host device, as well as other users and/or other devices associated with the host user. By way of example, one or more resources may include wireless access points that provide access to one or more networks to devices that connect to the wireless access point.

In step 303, the access control platform 103 processes social networking information associated with the at least one user (e.g., host user), the at least one device associated with the at least one user (e.g., host user's device), or a combination thereof to determine one or more social networking groups. The one or more social networking groups define social connections between the host user and/or the host device and other users and/or other devices. The social connections may be based on a hierarchy of social distances, such as the relationship of the host user to other specific users. As discussed above, the social distances that define the social networking groups may be, for example, family, friends, friends of friends, and others. Although the provided example includes four social networking groups, the number of social networking groups is practically unlimited. Further, each social networking group may be broken down into smaller groups, such as immediate family and distant relatives for the social networking group of family, and close friends and distant friends for the group of friends.

The social networking information may be provided directly to the access control platform 103 by the host user through one or more user interfaces created by the access control platform 103. By way of example, the host user may select one or more social networking groups defined by the access control platform 103 when registering a resource 115a at the access control platform 103. Further, the host user may provide access credentials to one or more social information providers that the access control platform 103 may access to retrieve the social information. The social information providers may include one or more services 109, such as social networking services 109a, and one or more content providers 113. Thus, the access control platform 103 may access the social information providers to obtain the social information and process the social information to determine the social networking groups.

In step 305, the access control platform 103 causes a controlling of access to the one or more resources for one or more other users, one or more other devices associated with the one or more other users, or a combination thereof based on membership in the one or more social networking groups. The access control platform 103 controls the access independently from controlling the configuration settings associated with the one or more resources. Rather, the access control platform 103 controls the access remotely at a device level of the devices and/or users attempting to access or currently accessing the one or resources 115. The access control platform 103 remotely configures and manages the one or more other devices attempting to access or currently accessing the one or more resources based on the membership in the social networking groups. As discussed in more detail below, the control may be based on prioritizing users and/or devices that have access to the resources based on the hierarchy of social networking groups. The control may also be based on one or more characteristics associated with the one or more resources. In one embodiment, the remote control is based on the access control platform 103 interfacing with the access control client applications 111a on the various user devices (e.g., UE 101) that access the resources 115. The access control platform 103 communicates with the access control client applications 111a when determining whether to prevent or revoke access to one or more devices to the resources 115. By remotely access the UE 101 based on the access control client applications 111a, the access control platform 103 can provide control over the resources 115 without directly controlling the configuration settings of the resources 115.

In one embodiment, the access control platform 103 may be configured to cause a device that has had its access to a resource 115a revoked to access one or more other resources 115. By way of example, a UE 101a may be currently accessing a wireless access point. Upon a higher-priority user accessing the wireless access point, the access to the wireless access point for the UE 101a may be revoked. Accordingly, the UE 101 may be automatically connected to a cellular network in response to the access to the wireless access point being revoked. In such a case, where the UE 101 was accessing the wireless access point for access to, for example, the Internet, the UE 101 may still connect to the Internet after having the access revoked but instead through the cellular network.

Figure 4:
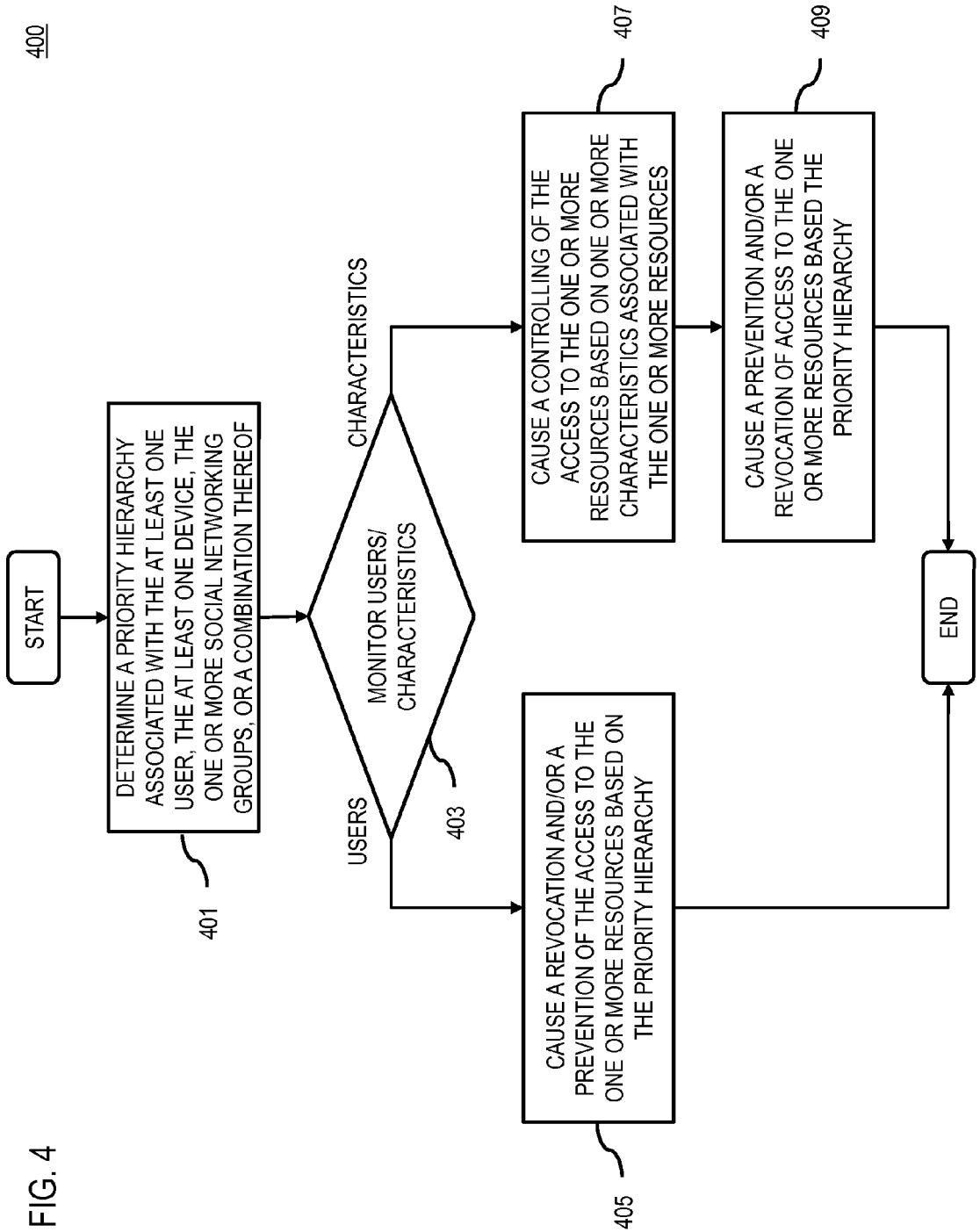
FIG. 4 is a flowchart of a process for controlling access to resources according to social connections and/or characteristics of the resources, according to one embodiment.

FIG. 4 is a flowchart of a process for controlling access to resources according to social connections and/or characteristics of the resources, according to one embodiment. In one embodiment, the access control platform 103 performs the process 400 and is implemented in, for instance, a chip set including a processor and a memory as shown in FIG. 8. In step 401, the access control platform 103 determines a priority hierarchy associated with the host user, the host device, the one or more social networking groups, or a combination thereof. The priority hierarchy determines what social networking groups have priority over other social networking groups. The priority hierarchy may also determine what priority the host user or the host device has over the social networking groups. By way of example, the hierarchy may be based on giving the host user and the host user's device the highest priority over all other users and other devices. Next, other users and other devices that have membership in the family social networking group may have priority over all other users and other devices. Further, other users and other devices that have membership in the friends social networking group may have priority over all other users and other devices, and so forth until the social networking groups have been assigned priority according to the priority hierarchy.

Next, in step 403, the access control platform 103 determines whether to monitor resources 115 based on the users associated with the resources 115 and/or the characteristics associated with the resources 115. In one embodiment, the access control platform 103 monitors the users or the characteristics associated with a resource 115a. In one embodiment, the access control platform 103 may monitor both the users and the characteristics associated with a resource 115a. If the access control platform 103 monitors the users and/or devices associated with a resource 115a, the process 400 proceeds to step 405. If the access control platform 103 monitors the characteristics associated with a resource, the process 400 proceeds to step 407. If the access control platform 103 monitors both the users and/or devices associated with a resource 115a and the characteristics associated with a resource 115a, the process 400 concurrently proceeds to steps 405 and 407.

In step 405, the access control platform 103 causes a revocation, a prevention, or a combination thereof of access by one or more users, one or more devices, or a combination thereof to one or more resources 115 based, at least in part, on the priority hierarchy determined in step 401. The access control platform 103 controls the revocation and/or the prevention of the access to ensure the security of the one or more resources 115 by controlling the users and/or devices that may access the resources 115 at any given. The revocation and the prevention of access to the one or more resources may be based on limiting lower-priority users and lower-priority devices from using the resources 115 while higher-priority users and higher-priority devices use the resources 115. Thus, higher-priority users and higher-priority devices may use the resources 115 while ensuring that, for example, lower-priority users and lower-priority devices do not comprise the security of the resources 115 by, for example, eavesdropping on the higher-priority users.

By way of example, if a higher-priority user is currently accessing a resource 115a, the access control platform 103 may prevent access by a lower-priority user to the resource 115a to maintain the security level of the resource 115a for the higher-priority user. Further, if a lower-priority user is currently accessing a resource 115a when a higher-priority user attempts to access the resource 115a, the access control platform 103 may revoke the access by the lower-priority user to the resource 115a to ensure a secure session by the higher-priority user using the resource 115a. In one embodiment, the access control platform 103 controls the revocation and prevention by interfacing with the access control client applications 111a associated with the devices of the users accessing and attempting to access the resources 115. The access control platform 103 instructs the access control client applications 111a to prevent access to a resource 115a by a lower-priority user if a higher-priority user is currently accessing the resource 115a. Similarly, the access control platform 103 instructs the access control client applications 111a to revoke access to a resource 115a by a lower-priority user if a higher-priority user is attempting to access the resource 115a. In one embodiment, the access control platform 103 controls the revocation and prevention of the access based on a granularity of the hierarchy, but ignores finer granularity of the hierarchies; such as allowing close friends and distant friends of the host user to use a resource 115a at the same time, but not allowing close friends to use the resource at the same time distant family members are using the resource 115a. In one embodiment, the access control platform 103 controls the revocation and prevention of the access based on all levels of granularity of the hierarchy. Further, in one embodiment, the access control platform 103 provides the option to higher-priority users and devices to allow lower-priority users and devices to concurrently access the one or more resources. By way of example, the access control platform 103 may notify a higher-priority user that a lower-priority user is attempting to access resource 115a currently being accessed by the higher-priority user. Thus, for example, if the higher-priority user is using the resource 115a for non-private tasks, the higher-priority user may allow the lower-priority user to concurrently use the resource 115a.

In one embodiment, the access control platform 103 may allow certain combinations of social networking groups to concurrently access a resource despite the groups having different priorities. For example, the access control platform 103 may allow the host user and family members of the host user to concurrently access a resource 115a. Further, the access control platform 103 may allow family and friends of the host user to concurrently access a resource 115a. Additionally, the access control platform 103 may allow friends and friends of friends of the host user to concurrently access a resource 115a. However, once a member of a social networking group attempts to access a resource that would combine two combinations of social networking groups, the access control platform 103 will revoke or prevent access to the resource 115a to avoid combining two combinations of social networking groups.

Accordingly, by controlling the revocation and prevention of access to resources 115 based on the priority hierarchy of one or more users and/or one or more devices, host users that own or maintain one or more resources may open the resources to a wider range of users while maintaining a level of security for more trusted users, or users that have a closer social relationship to the host user.

In step 407, the access control platform 103 determines to control one or more resources 115 according to the characteristics of the one or more resources 115. Accordingly, the access control platform 103 causes a controlling of the access to the one or more resources 115 based, at least in part, on one or more characteristics associated with the one or more resources 115. As discussed above, the characteristics may include, for example, a number of users associated with a resource 115a, performance characteristics associated with a resource 115a, etc. Where the resource 115a is a wireless access point, one of the performance characteristics may be the bandwidth associated with the resource 115a. The access control platform 103 may control the access of one or more users and/or one or more devices to the resource 115a to control the characteristics associated with the resource 115a. For example, if a characteristic is a number of users currently accessing a resource 115a, the access control platform 103 may prevent additional users from accessing the resource 115a. Further, if a characteristic is the bandwidth of a resource 115a, the access control platform 103 may revoke the access by one or more users to the resource 115a to lessen the bandwidth.

In step 409, the access control platform 103 causes a revocation, a prevention, or a combination thereof of the access to one or more resources based, at least in part, on the priority hierarchy of the users and the devices. For example, where a lower-priority user attempting to access a resource 115a would increase the number of users beyond a set threshold, the access control platform 103 may prevent the user from accessing the resource 115a. Where a higher-priority user is attempting to access a resource as compared to one or more lower-priority users that are currently accessing the resource 115a, the access control platform 103 may revoke the access of one or more of the lower-priority users from the resource 115a to allow the higher-priority user to access the resource 115a. Further, where the bandwidth decreases to below a threshold level, the access control platform 103 may revoke the access of a lower-priority user as compared to other, higher-priority users that are currently using the resource 115a, to increase the bandwidth to above the threshold level.

Accordingly, by controlling the revocation and prevention of access to resources 115 based on the characteristics of the one or more resources 115 according to the priority hierarchy of one or more user and/or one or more devices, host users that own or maintain one or more resources 115 may open the resources 115 to a wider range of users while maintaining a level of quality of service for more trusted users, or users that have a closer social relationship to the host user.

Figure 5:
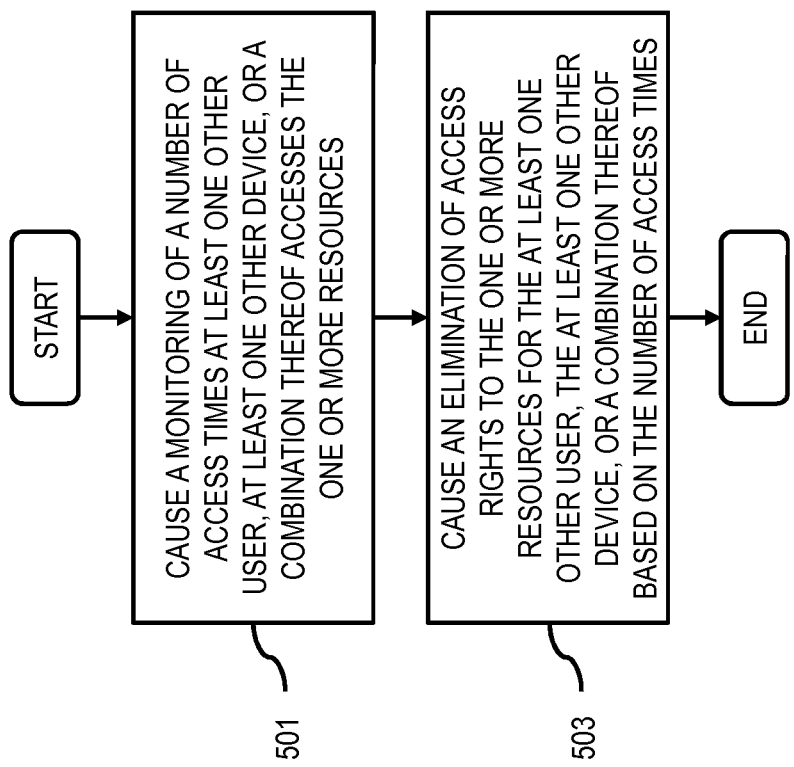
FIG. 5 is a flowchart of a process for eliminating access rights to one or more resources, according to one embodiment.

FIG. 5 is a flowchart of a process for eliminating access rights to one or more resources, according to one embodiment. In one embodiment, the access control platform 103 performs the process 500 and is implemented in, for instance, a chip set including a processor and a memory as shown in FIG. 8. In step 501, the access control platform 103 causes a monitoring of a number of access times at least one other user, at least one other device, or a combination thereof accesses one or more resources 115. For example, each time a user attempts to access a resource 115a, the access control client application 111a associated with the device of the user should interface with the access control platform 103 to determine whether the user has permission to access the resource 115a. If the access control client application 111a does not interface with the access control platform 103, this may indicate that the user of the device may have corrupted the security procedures implemented using the access control platform 103 and may be able to improperly access the resource 115a.

In step 503, the access control platform 103 causes an elimination of the access rights to the one or more resources for one or more users and/or one or more devices based, at least in part, on the number of access times determined in step 501. Thus, if the number of access times the access control client application 111a interfaces with the access control platform 103 is less than the number of times the device associated with the access control client application 111a interfaces with a resource 115a, the access control platform 103 eliminates the security credentials to the resource so the device can no longer access the resource 115a. The access control platform 103 removes the ability of the device to access the resource to prevent a malicious user from reducing the security and/or the quality of service of the resource 115a. In one embodiment, the access control platform 103 logs identification information (e.g., IP address, MAC address, etc.) of the device associated with the unauthorized access to prevent the device from reacquiring the security credentials in the future. Thus, the access control platform 103 offers the additional security of permanently removing users and/or users that are associated with unauthorized access to one or more resources 115.

Figure 6B:
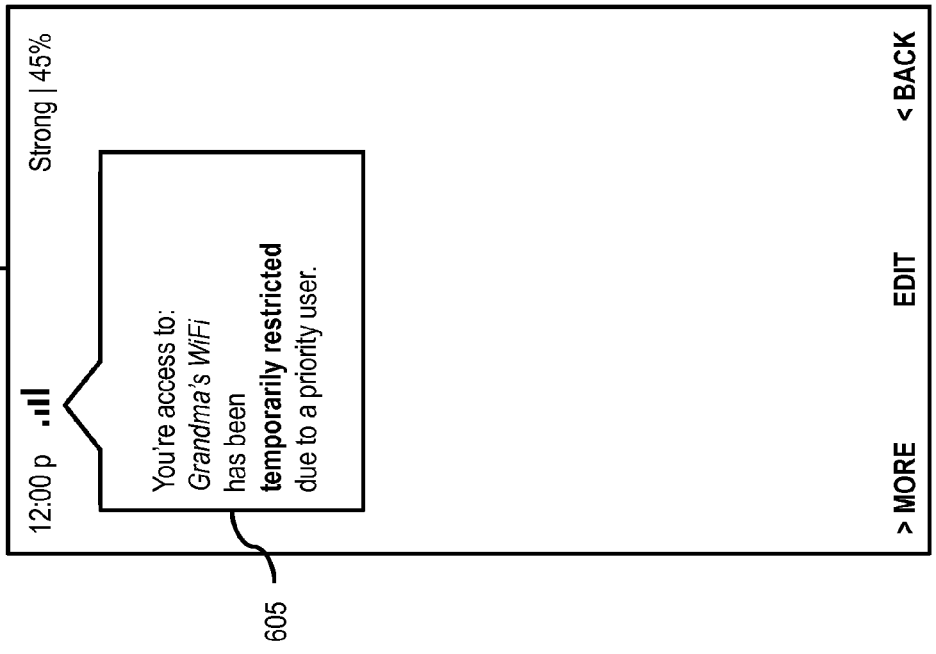
FIGS. 6A-6D are diagrams of user interfaces utilized in the processes of FIGS. 3-5, according to various embodiments.
Figure 6A:
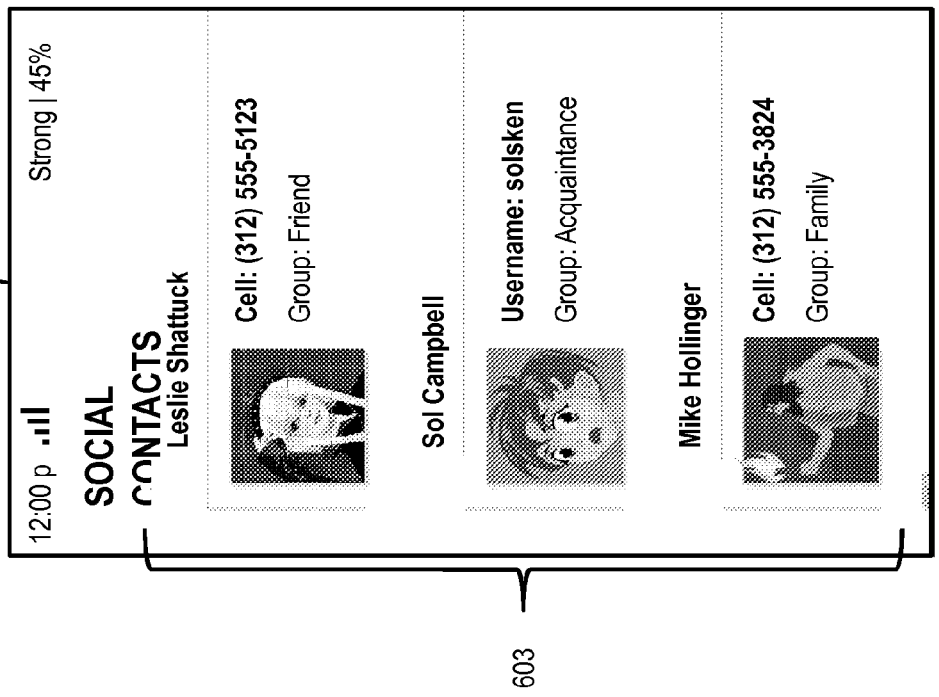

FIGS. 6A-6D are diagrams of user interfaces utilized in the processes of FIGS. 3-5, according to various embodiments. FIG. 6A illustrates a user interface 601a associated with a social networking service 109a that includes one or more contacts 603 that may be processed by the access control platform 103 to determine one or more users and/or devices associated with a host user that may access a resource owned or maintained by the host user. By way of example, the contacts 603 may be contacts of the host user within the social networking service 109a. Further, as illustrated with respect to the contacts 603, each one of the contacts is identified as belonging to a social networking group, such as Friend, Acquaintance, and Family. Thus, in one embodiment, the contacts 603 identified by a social networking service 109a may also include information that the access control platform 103 may use to determine the social distances between the contacts 603 and the host user that are used to determine the priority hierarchy of the users when accessing one or more resources 115.

FIG. 6B illustrates a user interface 601b associated with a UE 101 that had its access to a resource 115a revoked based on a higher-priority user accessing the same resource 115a. By way of example, the user interface 601b may include an indicator 605 that indicates the resource 115a associated with the access that was revoked (e.g., Grandma's WiFi) and the reason the access was revoked (e.g., a priority user). In one embodiment, the indicator 605 may also indicate, or in the alternative indicate, that access was revoked based on one or more characteristics of the resource 115a.

Figure 6D:
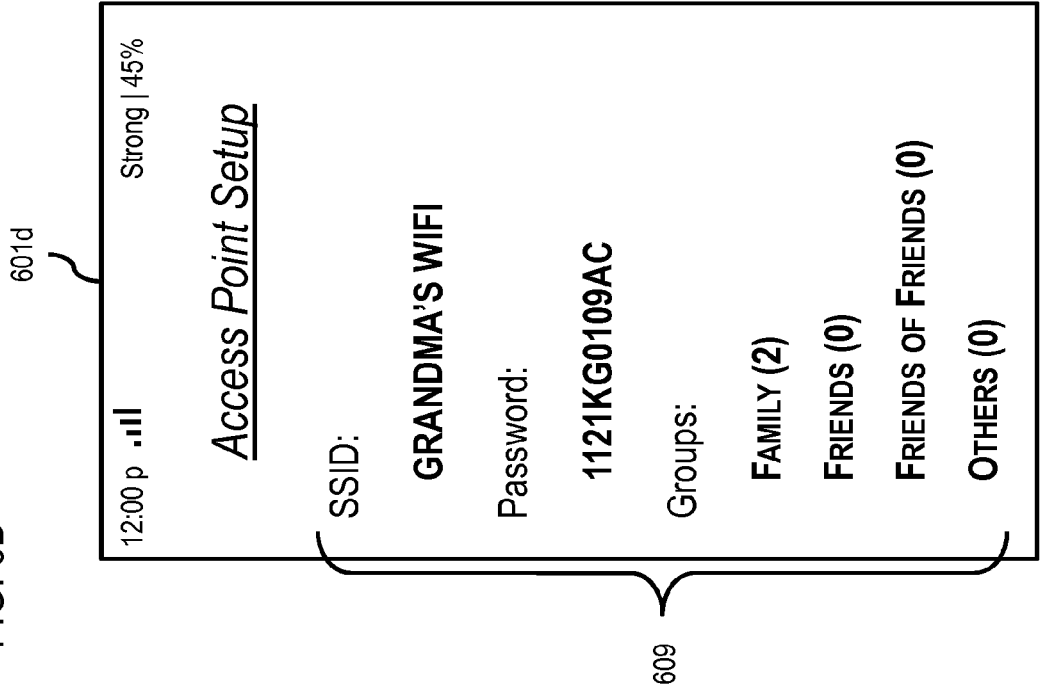
Figure 6C:
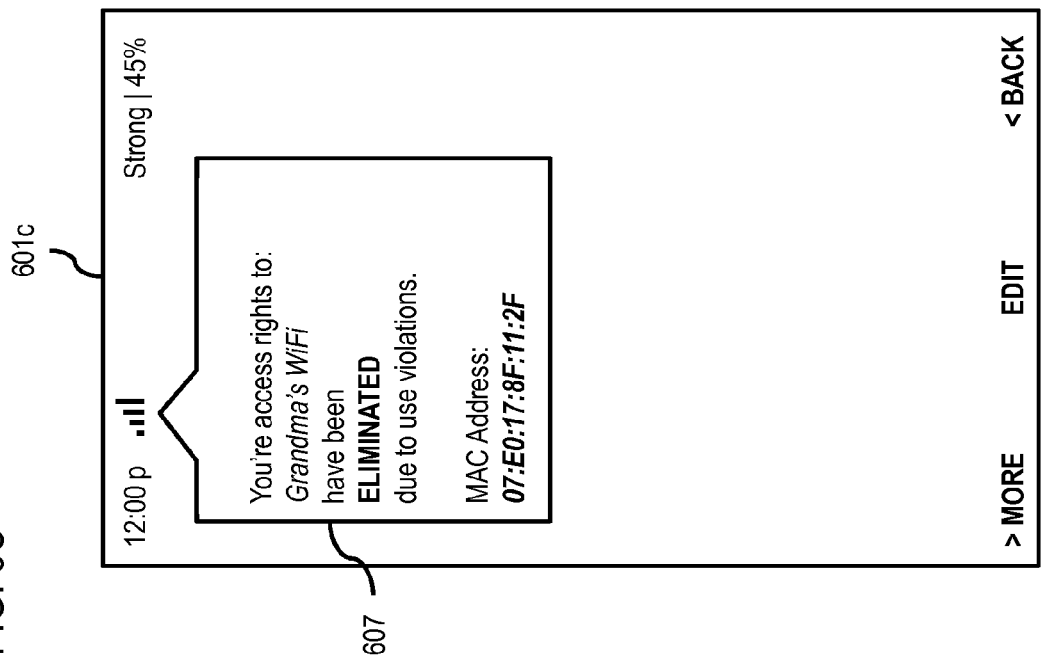

FIG. 6C illustrates the user interface 601c associated with a UE 101 that had it access rights to a resource eliminated based on use violations associated with the security credentials as illustrated based on the indicator 607. For example, the user associated with the UE 101 may have changed the process of the access control client application 111a communicating with the access control platform 103 such that the application 111a does not communicate with the access control platform 103 to control the access to one or more resources. In one embodiment, the access control platform 103 logs identification information associated with the device (e.g., MAC address) to ensure that the device is not provided the security credentials again in the future, as illustrated by the indicator 607.

FIG. 6D illustrates the user interface 601d associated with a UE 101 used by a host user to register and configure a resource 115a (e.g., a wireless access point) with the access control platform 103. The user interface 601d may include one or more parameters 609 used to identify the resource (e.g., SSID: Grandma's WiFi), used for security credentials (e.g., Password: 1121KG0109AC), and one or more social networking groups that are used to create the priority hierarchy. In one embodiment, as illustrated, the order in which the social networking groups are listed provides the priority ranking. In one embodiment, the host user may assign the priority hierarchy based on, for example, one or more rating systems (e.g., numbers, starts, etc.). The user interface 6D associated with the configuration of the resource 115a may also include information associated with how many users and/or devices are currently connected to the resource 115a (e.g., the numbers next to the social networking groups), or any other additional information associated with the users and/or devices currently associated with the resource 115a.

The processes described herein for controlling access to resources according to social connections and/or characteristics of the resources may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
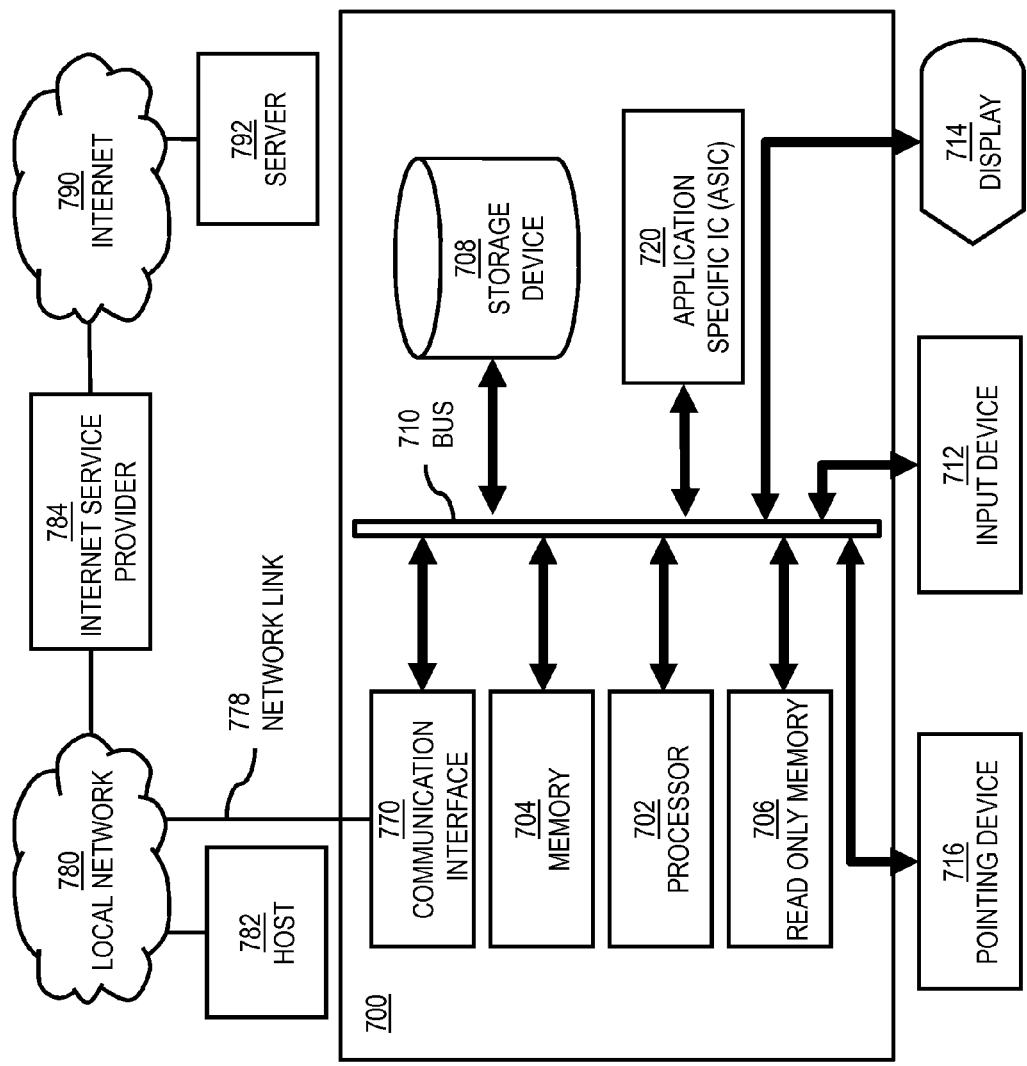
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to control access to resources according to social connections and/or characteristics of the resources as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of controlling access to resources according to social connections and/or characteristics of the resources.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to controlling access to resources according to social connections and/or characteristics of the resources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for controlling access to resources according to social connections and/or characteristics of the resources. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for controlling access to resources according to social connections and/or characteristics of the resources, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing remote management controlling access to resources according to social connections and/or characteristics of the resources at the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to control access to resources according to social connections and/or characteristics of the resources as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of controlling access to resources according to social connections and/or characteristics of the resources.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to control access to resources according to social connections and/or characteristics of the resources. The memory 805 also stores the data associated with or generated by the execution of the inventive steps.

Figure 9:
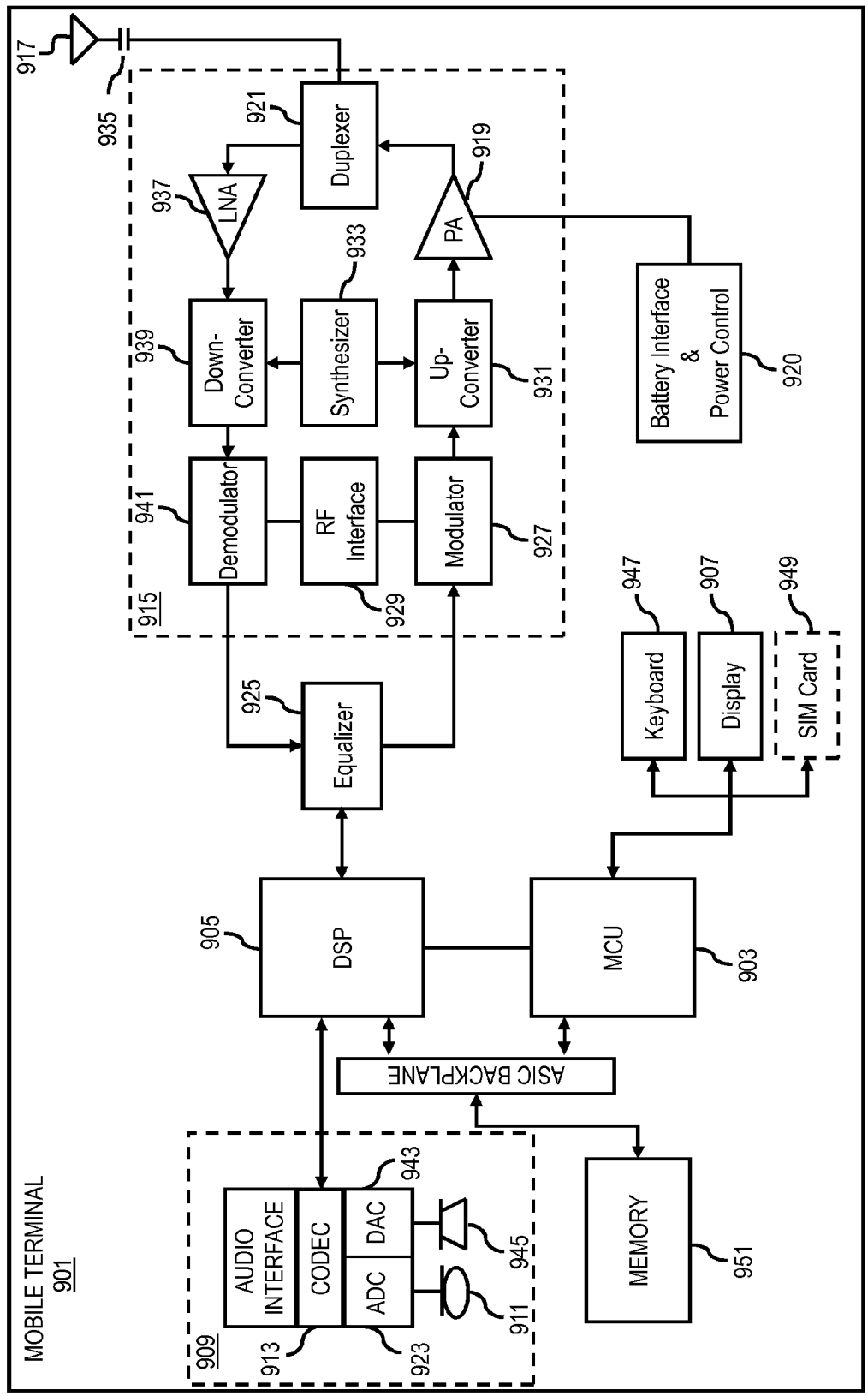
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of controlling access to resources according to social connections and/or characteristics of the resources. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of controlling access to resources according to social connections and/or characteristics of the resources. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to control access to resources according to social connections and/or characteristics of the resources. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   one or more resources associated with at least one user, at least one device associated with the at least one user, or a combination thereof;
   a processing of social networking information associated with the at least one user, the at least one device, or a combination thereof to determine one or more social networking groups; and
   a controlling of access to the one or more resources for one or more other users, one or more other devices associated with the one or more other users, or a combination thereof based, at least in part, on (a) membership in the one or more social networking groups, and (b) one or more characteristics associated with the one or more resources,
   wherein the one or more resources include one or more wireless access points, and the one or more characteristics include a number of users accessing the one or more wireless access points, a traffic load associated with the one or more wireless access points, or a combination thereof.

2. A method of claim 1, wherein the (1) data and/or (2) information and/or (3) at least one signal are further based, at least in part, on the following:
   a priority hierarchy associated with the at least one user, the at least one device, the one or more social networking groups, or a combination thereof; and
   a controlling of the access to the one or more resources for the one or more other users, the one or more other devices, or a combination thereof based, at least in part, on the priority hierarchy.

3. A method of claim 2, wherein the (1) data and/or (2) information and/or (3) at least one signal are further based, at least in part, on the following:
   a revocation, a prevention, or a combination thereof of the access to the one or more resources for the one or more other users, the one or more other devices, or a combination thereof based, at least in part, on the priority hierarchy.

4. A method of claim 3, wherein access of one or more lower-priority other users, one or more lower-priority other devices, or a combination thereof to the one or more resources is revoked, prevented, or a combination thereof based, at least in part, on access by one or more higher-priority users, one or more higher-priority devices, or a combination thereof to the one or more resources.

5. A method of claim 2, wherein the (1) data and/or (2) information and/or (3) at least one signal are further based, at least in part, on the following:
   a prevention, a revocation, or a combination thereof of access to the one or more resources of the one or more other users, the one or more other devices, or a combination thereof based, at least in part, on the priority hierarchy.

6. A method of claim 5, wherein access to the one or more resources is revoked for one or more lower-priority users, one or more lower-priority devices, or a combination thereof prior to access for one or more higher-priority users, one or more higher-priority devices, or a combination thereof.

7. A method of claim 1, wherein the (1) data and/or (2) information and/or (3) at least one signal are further based, at least in part, on the following:
   a monitoring of a number of access times at least one other user, at least one other device, or a combination thereof accesses the one or more resources; and
   an elimination of access rights to the one or more resources for the at least one other user, the at least one other device, or a combination thereof based, at least in part, on the number of access times.

8. A method of claim 1, wherein the one or more social networking groups include at least one of a family group, a friends group, a friends of friends group, and an others group.

9. A method of claim 1, wherein the controlling of access to the one or more resources is independent from controlling of configuration settings associated with the one or more resources.

10. An apparatus comprising:
at least one processor; and
at least one memory including computer program code for one or more programs,
the at least one memory and the computer program code configured to, with the at least one processor, cause the apparatus to perform at least the following,
determine one or more resources associated with at least one user, at least one device associated with the at least one user, or a combination thereof;
process and/or facilitate a processing of social networking information associated with the at least one user, the at least one device, or a combination thereof to determine one or more social networking groups; and
cause, at least in part, a controlling of access to the one or more resources for one or more other users, one or more other devices associated with the one or more other users, or a combination thereof based, at least in part, on (a) membership in the one or more social networking groups, and (b) one or more characteristics associated with the one or more resources,
wherein the one or more resources include one or more wireless access points, and the one or more characteristics include a number of users accessing the one or more wireless access points, a traffic load associated with the one or more wireless access points, or a combination thereof.

11. An apparatus of claim 10, wherein the apparatus is further caused to:
determine a priority hierarchy associated with the at least one user, the at least one device, the one or more social networking groups, or a combination thereof; and
cause, at least in part, a controlling of the access to the one or more resources for the one or more other users, the one or more other devices, or a combination thereof based, at least in part, on the priority hierarchy.

12. An apparatus of claim 11, wherein the apparatus is further caused to:
cause, at least in part, a revocation, a prevention, or a combination thereof of the access to the one or more resources for the one or more other users, the one or more other devices, or a combination thereof based, at least in part, on the priority hierarchy.

13. An apparatus of claim 12, wherein access of one or more lower-priority other users, one or more lower-priority other devices, or a combination thereof to the one or more resources is revoked, prevented, or a combination thereof based, at least in part, on access by one or more higher-priority users, one or more higher-priority devices, or a combination thereof to the one or more resources.

14. An apparatus of claim 10, wherein the apparatus is further caused to:
cause, at least in part, a prevention, a revocation, or a combination thereof of access to the one or more resources of the one or more other users, the one or more other devices, or a combination thereof based, at least in part, on the priority hierarchy.

15. An apparatus of claim 14, wherein access to the one or more resources is revoked for one or more lower-priority users, one or more lower-priority devices, or a combination thereof prior to access for one or more higher-priority users, one or more higher-priority devices, or a combination thereof.

16. An apparatus of claim 10, wherein the apparatus is further caused to:
cause, at least in part, a monitoring of a number of access times at least one other user, at least one other device, or a combination thereof accesses the one or more resources; and
cause, at least in part, an elimination of access rights to the one or more resources for the at least one other user, the at least one other device, or a combination thereof based, at least in part, on the number of access times.

17. An apparatus of claim 10, wherein the one or more social networking groups include at least one of a family group, a friends group, a friends of friends group, and an others group.

* * * * *